US010951646B2

(12) United States Patent
Chantz

(10) Patent No.: US 10,951,646 B2
(45) Date of Patent: *Mar. 16, 2021

(54) BIOLOGY BASED TECHNIQUES FOR HANDLING INFORMATION SECURITY AND PRIVACY

(71) Applicant: International Business Machines Corporation, Armonk, NY (US)

(72) Inventor: Hyman D. Chantz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 108 days.

This patent is subject to a terminal disclaimer.

(21) Appl. No.: 16/161,212

(22) Filed: Oct. 16, 2018

(65) Prior Publication Data
US 2019/0052669 A1    Feb. 14, 2019

Related U.S. Application Data

(63) Continuation of application No. 15/138,564, filed on Apr. 26, 2016, now Pat. No. 10,110,626.

(51) Int. Cl.
| H04L 29/06 | (2006.01) |
| G06F 21/53 | (2013.01) |
| G06F 21/57 | (2013.01) |

(52) U.S. Cl.
CPC .......... *H04L 63/1441* (2013.01); *G06F 21/53* (2013.01); *G06F 21/577* (2013.01);
(Continued)

(58) Field of Classification Search
CPC ............. H04L 63/1441; H04L 63/1491; H04L 63/1425; G06F 21/53; G06F 2221/034
See application file for complete search history.

(56) References Cited

U.S. PATENT DOCUMENTS

| 8,018,943 B1 | 9/2011 | Pleshek et al. |
| 8,335,238 B2 | 12/2012 | Arimilli et al. |
(Continued)

OTHER PUBLICATIONS

List of IBM Patents or Patent Applications Treated as Related, Oct. 15, 2018, 2 pages.
(Continued)

*Primary Examiner* — Harunur Rashid
(74) *Attorney, Agent, or Firm* — Stephen J. Walder, Jr.; Jeffrey S. LaBaw

(57) ABSTRACT

A local segment analysis and security (LSAS) engine method, computer program product, and apparatus are provided. The LSAS engine collects status metrics indicating a current operational status of the computing resources within a first segment of a computing environment, analyzes the status metrics to determine whether the first segment is the target of a first attack, and receives, from another LSAS engine of a second segment of the computing environment, a message indicating a status of the second segment with regard to the second segment being a target of a second attack. The LSAS engine determines a security response action to implement based on the received message and results of the analysis and transmits a control message to a computing resource of the first segment to implement the determined security response action. The security response action is at least one of a segmentation, dilution, or scaffolding security response action.

20 Claims, 6 Drawing Sheets

(52) U.S. Cl.
CPC ...... *H04L 63/1408* (2013.01); *H04L 63/1425* (2013.01); *H04L 63/1491* (2013.01); *G06F 2221/034* (2013.01)

(56) References Cited

U.S. PATENT DOCUMENTS

| | | | |
|---|---|---|---|
| 8,407,160 | B2 | 3/2013 | Cretu et al. |
| 8,646,090 | B1 | 2/2014 | Gadde et al. |
| 9,003,528 | B2 | 4/2015 | Stolfo |
| 9,075,410 | B2 | 7/2015 | Ohkado et al. |
| 10,120,746 | B1 | 11/2018 | Mehr |
| 2003/0188189 | A1 | 10/2003 | Desai et al. |
| 2011/0138470 | A1 | 6/2011 | Davis et al. |
| 2011/0231510 | A1 | 9/2011 | Korsunsky et al. |
| 2011/0247072 | A1 | 10/2011 | Staniford et al. |
| 2012/0324572 | A1* | 12/2012 | Gordon ............... H04L 63/1458 726/22 |
| 2016/0012235 | A1 | 1/2016 | Lee et al. |
| 2016/0088000 | A1 | 3/2016 | Kumar et al. |
| 2016/0308898 | A1* | 10/2016 | Teeple ............... H04L 63/1433 |
| 2017/0147942 | A1 | 5/2017 | Gao et al. |
| 2017/0214701 | A1 | 7/2017 | Hasan |
| 2017/0310702 | A1 | 10/2017 | Chantz |
| 2018/0131716 | A1 | 5/2018 | Chantz |
| 2018/0351783 | A1 | 12/2018 | Patrich et al. |

OTHER PUBLICATIONS

"Computer Immune Systems", Computer Science Department, Farris Engineering Center, University of New Mexico, http://www.cs.unm.edu/~immsec/research.htm, Accessed from the Internet on Feb. 23, 2017, 1 page.

"New to Artificial Immune Systems?", The Online Home of Artificial Immune Systems, AISWeb, http://www.artificial-immune-systems.org/people-new.shtml, Oct. 2013, 4 pages.

Amin, Reham et al., "Biometric and Traditional Mobile Authentication Techniques: Overviews and Open Issues", Bio-inspiring Cyber Security and Cloud Services: Trends and Innovations, Intelligent Systems Reference Library 70, Chapter 16, 2014, pp. 423-446.

Burgess, Mark, "Biology, Immunology and Information Security", Information Security Technical Report, vol. 12 Issue 4, Oct. 2007, pp. 192-199.

Burgess, Mark et al., "Computer Immunology", Proceedings of the Twelfth Systems Administration Conference (LISA '98), Dec. 6-11, 1998, 17 pages.

Chantz, Hy , "Systems Biology Implications for Cloud Computing Security", ELEN 6010, May 14, 2015, 13 pages.

Chantz, Hy , "Systems Biology Implications for Cloud Computing Security", ELEN 6010, Spring 2015, May 12, 2015, 30 pages.

D'Haeseleer, Patrik et al., "An Immunological Approach to Change Detection: Algorithms, Analysis and Implications", IEEE Symposium on Security and Privacy, 1996, http://www.cs.unm.edu/~immsec/publications/ieee-sp-96-neg-selec.pdf, May 1996, 10 pages.

Forrest, Stephanie et al., "A Sense of Self for Unix Processes", In Proceedings of the 1996 IEEE Symposium on Security and Privacy, http://www.cs.unm.edu/~immsec/publications/ieee-sp-96-unix.pdf, May 1996, 9 pages.

Forrest, Stephanie et al., "Computer Immunology", Communications of the ACM, vol. 40, No. 10, Oct. 1997, pp. 88-96.

Forrest, Stephanie et al., "Computer Immunology", Dept. of Computer Science, University of New Mexico, Mar. 21, 1996, 18 pages.

Forrest, Stephanie et al., "Computer Immunology", Dept. of Computer Science, University of New Mexico, Oct. 29, 2006, http://www.cs.unm.edu/~forrest/publications/computer-immunology.pdf, 43 pages.

Forrest, Stephanie , "Sensitive Data in a Wired World Negative Respresentations of Data", Dept. of Computer Science, Univ. of New Mexico, Accessed from the Internet on Feb. 23, 2017, http://www.cs.yale.edu/homes/jf/Forrest.ppt, 20 pages.

Gaber, Tarek et al., "An Overview of Self-Protection and Self-Healing in Wireless Sensor Networks", Bio-inspiring Cyber Security and Cloud Services: Trends and Innovations, Intelligent Systems Reference Library 70, Chapter 7, 2014, pp. 185-202.

George, Selvin et al., "A Biological Programming Model for Self-Healing", SSRS '03, Oct. 31, 2003, http://www.cs.virginia.edu/~evans/pubs/ssrs.pdf, 10 pages.

Goel, Sanjay et al., "Biological Models of Security for Virus Propagation in Computer Networks", ;LOGIN, Dec. 2004, pp. 49-56.

Haris, S.H.C. et al., "Anomaly Detection of IP Header Threats", International Journal of Computer Science and Security, (IJCSS), vol. 4: Issue (6), Jan. 2011, 9 pages.

Hofmeyr, Steven A. et al., "Immunity by Design: An Artificial Immune System", Dept. of Computer Science, University of New Mexico, Accessed from the Internet on Feb. 23, 2017, http://www.cs.unm.edu/~immsec/publications/gecco-steve.pdf, 8 pages.

Hofmeyr, Steven, "The implications of immunology for secure systems design", Computers & Security, vol. 23, Issue 6, Sep. 2004, pp. 453-455.

Jamdagni, Aruna et al., "Intrusion Detection Using Geometrical Structure", 2009 International Conference on Frontier of Computer Science and Technology, Dec. 17-19, 2009, pp. 327-333.

Levin, Carol, "Biology Battles PC Viruses", PC Magazine, Apr. 9, 1996, p. 34.

Norton, Steven, "CIO Explainer: What is Blockchain?", The Wall Street Journal, CIO Journal, Feb. 2, 2016, Accessed from the Internet on Sep. 15, 2016, https://blogs.wsj.com/cio/2016/02/02/cio-explainer-what-is-blockchain/, 7 pages.

Roberts, Jeff J., "Why Accenture's Plan to 'Edit' the Blockchain Is a Big Deal", POINTCLOUD, http://fortune.com/2016/09/20/Accenture-blockchain/, Sep. 20, 2016, 6 pages.

Shen, Junyuan et al., "An Improved Artificial Immune System-Based Network Intrusion Detection by Using Rough Set", Communications and Network, vol. 4, http://www.scirp.org/journal/PaperDownload.aspx?paperID=17496, Feb. 2012, pp. 41-47.

Somayaji, Anil et al., "Principles of a Computer Immune System", New Security Paradigms, Workshop, 1997, Accessed from the Internet on Feb. 23, 2017, http://www.cs.unm.edu/~immsec/publications/nspw-97.pdf, pp. 75-82.

Yang, Jin et al., "Cloud Computing for Network Security Intrusion Detection System", Journal of Networks vol. 8, No. 1, Jan. 2013, pp. 140-147.

* cited by examiner

US 10,951,646 B2

BIOLOGY BASED TECHNIQUES FOR HANDLING INFORMATION SECURITY AND PRIVACY

BACKGROUND

The present application relates generally to an improved data processing apparatus and method and more specifically to mechanisms for providing biology based techniques for handling information security and privacy.

Correspondence between biological diseases and computer-based problems has been remarked upon for several decades. There has been much attention paid to computer viruses, which has spawned an entire field of "computer immunology". For example, in his paper "Computer Immunology," Proceedings of the Twelfth Systems Administration Conference (LISA '98), Dec. 6-11, 1998, Mark Burgess commented on the fragile nature of modern computer systems and their unreliability as well as the comparability of biological and social systems with computer systems such that, similar to such biological and social systems, computing systems need self-healing processes which eliminate or minimize the dependence on human involvement.

Stephanie Forrest, Steven Hofmeyr, and Anil Somayaji described, in their paper entitled "Computer Immunology," Department of Computer Science, University of New Mexico, Mar. 21, 1996, the correspondence between biological systems and computing systems and that this correspondence is a compelling reason to consider for improving computer security. In another publication also entitled "Computer Immunology," Department of Computer Science, University of New Mexico, Oct. 29, 2006, Stephanie Forrest and Catherine Beauchemin describe a body of work that constructs computational immune systems that behave analogously to the natural immune system. These artificial immune systems (AIS) simulate the behavior of a natural immune system and, in some cases, have been used to solve practical engineering problems, such as computer security.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions which are executed by the at least one processor to configure the data processing system to implement a local segment analysis and security (LSAS) engine. The LSAS engine operates to collect, from one or more agents associated with computing resources in a first segment of a computing environment, status metrics indicating a current operational status of the computing resources within the first segment. The LSAS engine further operates to analyze the status metrics to determine whether the first segment is the target of a first attack on one or more computing resources of the first segment. Moreover, the LSAS engine operates to receive, from one or more other LSAS engines associated with one or more second segments of the computing environment, at least one message indicating a status of the one or more second segments with regard to the one or more second segments being a target of a second attack. The LSAS engine determines a security response action to implement based on the received at least one message and results of the analysis and transmits a control message to at least one computing resource of the first segment to implement the determined security response action, wherein the determined security response action is at least one of a segmentation security response action, a dilution security response action, or a scaffolding security response action.

In other illustrative embodiments, a computer program product comprising a computer useable or readable medium having a computer readable program is provided. The computer readable program, when executed on a computing device, causes the computing device to implement an LSAS engine that performs various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to implement an LSAS engine that operates to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
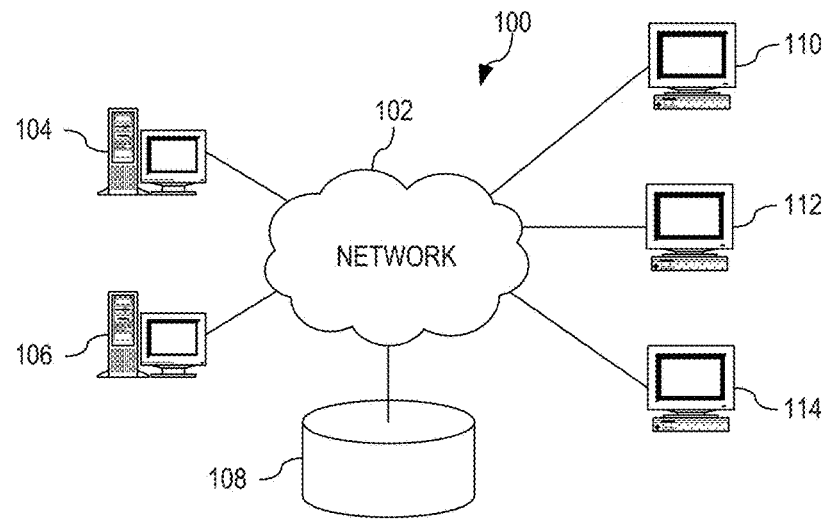
FIG. 1 is an example diagram of a distributed data processing system in which aspects of the illustrative embodiments may be implemented.

The illustrative embodiments provide mechanisms for addressing aspects of computing system intrusion by modeling the solution after biological responses to biological intrusions, such as biological viruses. In particular, the mechanisms of the illustrative embodiments are directed to a "swelling" aspect of a computing system intrusion and providing security and privacy countermeasures to address this swelling aspect. The biological concept of "swelling", which provides locally-determined scaffolding, dilution, and segmentation of an area under stress or attack, is used to model the solutions provided by the mechanism of the illustrative embodiments. The mechanisms of the illustrative embodiments may be applied to stand alone or distributed data processing system environments. In some illustrative embodiments, the mechanisms will be described in the context of a cloud computing environment, however the illustrative embodiments are not limited to such.

As mentioned above, there has been much discussion as to how there is a correlation between biological systems and computing systems. Such discussion even, at times, generally supports looking at biological systems to model computer based systems to address certain issues. However, such discussions do not adequately provide solutions for addressing such issues, rather just general guidelines.

One area of specific interest is the area of computer security and data privacy. As mentioned above, with regard to such areas, interest is primarily directed to computer viruses and immunizing computer systems against computer viruses in a similar manner to the way in which biological viruses are treated.

In the early ages of medicine, a few key motifs were used to describe disease processes and provide for symptoms and sensing as guides to repair. A famous rubric of Aelius Galenus (c. 169 AD) was: "Calor, dolor, rubor, tumor" which roughly means that disease symptoms to be sensed and addressed during treatment are heat, pain, redness and swelling. In the modern age, the operation of "sensing" has become more of an electronic operation which permits the storing, transmission, and manipulation of the sensed information, i.e. electronic sensing with the resulting data being able to be stored, transmitted, and manipulated.

Taking Galenus' rubric as an example, a general biological response to an intrusion, assault, or physiological insult, as may be experienced due to a biological virus, can be equated to a modern computing system's response using the following comparison table:

TABLE 1

Comparison of Biological and Computer System Intrusion Aspects

|  | Biological Intrusion Aspect | Computing System Intrusion Aspect |
| --- | --- | --- |
| Calor | Heat | Activation of Defenses |
| Dolor | Pain | Alerting |
| Rubor | Redness | Identification |
| Tumor | Swelling | ? |

In the discussions of how to model computing systems after biological systems with regard to providing artificial immune systems for these computing systems, only the calor, dolor, and rubor aspects have been addressed, i.e. by way of providing automated mechanisms for activation of defenses, alerting when there is an intrusion, and identification of the type of intrusion. Existing mechanisms, and known literature directed to this issue, do not provide an adequate solution for addressing the tumor aspect, i.e. the "swelling" biological aspect, when considering automated mechanisms for immunizing computer systems. The present invention addresses the "swelling" or tumor aspect of a computer system as a security and privacy countermeasure issue and provides automated mechanisms for addressing such issues.

For example, when a human body is subjected to an injury, such as a bee sting, sprain, or the like, the body responds, in part, by having a swelling reaction that is initially objectionable, but ultimately is curative in nature. In the context of a bee sting, for example, the swelling provides dilution of the venom, segmentation of the affected area from the rest of the body preventing or minimizing the spread of the venom, and scaffolding or support of the repair mechanism for repairing the harm done to the body. In a similar manner, segmentation, dilution, and scaffolding may be applied to computing systems. With regard to segmentation, mechanisms for quarantining and segregation portions of the computing system may be utilized to provide similar segmentation results to a biological swelling reaction. Regarding dilution, mechanisms for rapid creation or redirection of traffic to micro-environments or providing sandboxing may be utilized to provide a similar dilution result as in a biological swelling reaction. With regard to scaffolding, mechanisms for providing compensating controls and temporary delay of operations may be utilized to provide similar scaffolding results to that of biological swelling reactions.

In order to provide a context in which to describe the various mechanisms for implementing the segmentation, dilution, and scaffolding aspects of attack or intrusion response in a computing system, a description of a computing environment in which these aspects may be implemented will first be described. While the computing environment is described as a distributed data processing system which may implement cloud computing mechanisms, it should be appreciated that the present invention is not limited to such and may be utilized with any computing environment in which the mechanisms for segmentation, dilution, and scaffolding operations may be performed in response to detected attacks or intrusions. Such computing environments may include stand alone computing devices coupled to a data network and which communicate with other devices via a data network, local area networks of computing devices, wide area networks of computing devices, or the like.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
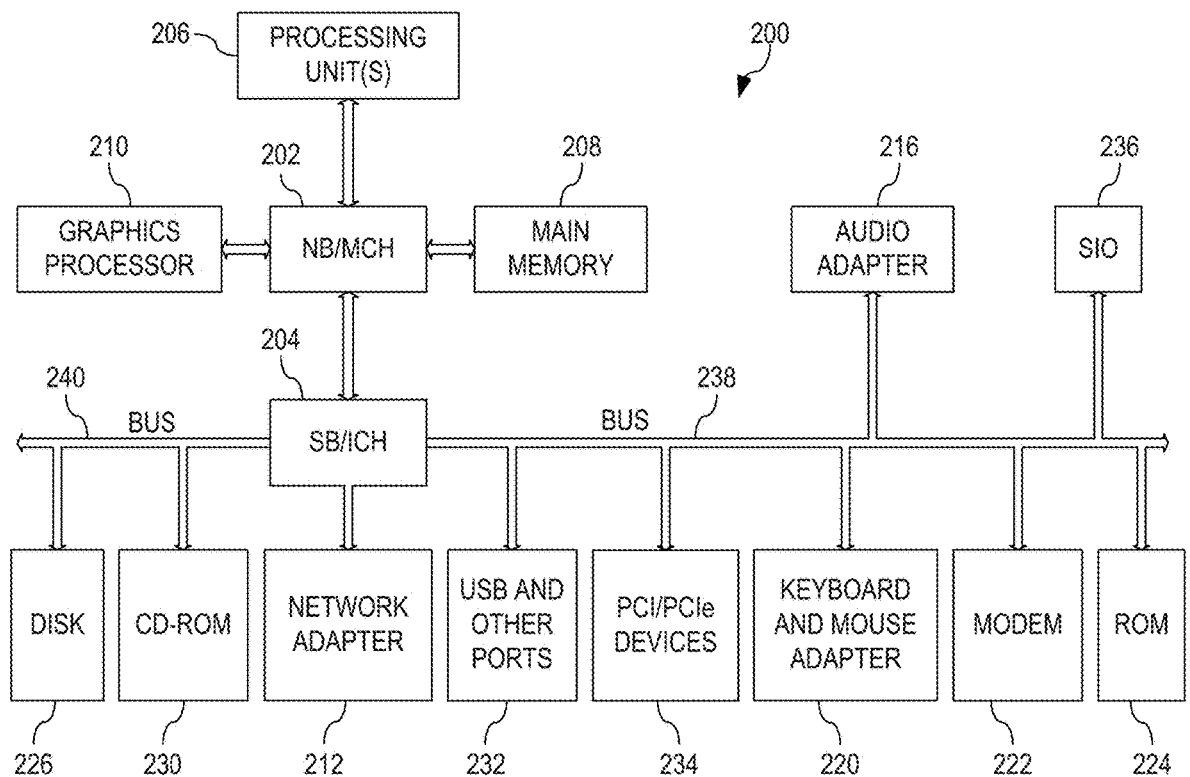
FIG. 2 is an example block diagram of a computing device in which aspects of the illustrative embodiments may be implemented.

As noted above, the illustrative embodiments may be utilized in many different types of data processing environments. FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Although not shown in FIG. 1, it should be appreciated that the distributed data processing system may comprise various routers, switches, and other hardware and software mechanisms for facilitating the communication of data between computing devices (these are generally represented as the cloud representing network 102 in FIG. 1). Moreover, the network 102 may be comprised of a plurality of data networks coupled to one another via edge devices, such as edge routers, edge servers, or the like, which provide a communication pathway between the various data networks, e.g., local area networks, private networks, and the like. The various individual data networks that may collectively be represented by network 102 may be associated with particular geographic regions, organizational departments or other portions of an organization, associated with various portions of a defined network topology, or any other grouping or stratification of a real or virtual topology.

In accordance with the mechanisms of the illustrative embodiments, one or more of the computing devices, e.g., server 104, routers, switches, or other element of the network 102 infrastructure may be specifically configured to implement a local segment analysis and security (LSAS) engine. Alternatively, a dedicated hardware logic device or computing device configured with, and executing, software may be provided for implementing such a LSAS engine. The configuring of the computing device, or dedicated device, may comprise the providing of application specific hardware, firmware, or the like to facilitate the performance of the operations and generation of the outputs described herein with regard to the illustrative embodiments. The configuring of the computing device/dedicated device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates a security response to detected attacks or intrusions that involves providing segmentation, dilution, and scaffolding reactions to detected attacks or intrusions modeled on biological responses to bodily attacks.

In some illustrative embodiments, the distributed data processing system 100 in FIG. 1 is segmented into a plurality of initial segments representing localized networks of computing devices, which may then be dynamically segmented further into sub-segments in response to a detected attack or intrusion in accordance with the illustrative embodiments as described hereafter. While these localized networks are considered "localized", the networks themselves may be local area networks, private networks, or even wide area networks. The term "localized" refers to the segments being self-contained associations of computing devices and the data network infrastructure for providing data communication between these computing devices. The localized networks may communicate with other localized networks via edge devices, such as edge routers, edge servers, gateway devices, and the like, which stand on the edge of the localized network between it and other networks. The edge device preferably includes a local segment analysis and security (LSAS) engine configured in accordance with one or more of the illustrative embodiments described herein. Each segment may have one or more LSAS engines associated with one or more computing devices of the segment, which may be edge devices or other devices associated with the segment. For purposes of the following discussion, it will be assumed that the LSAS engine is implemented as software instructions loaded into memory and executed so as to configure an edge device, such as a router, switch, server computing device or the like, to implement the LSAS engine.

The LSAS engine operates to monitor operations and conditions within its own associated segment and communicate with LSAS engines associated with other segments. The LSAS engine may interface with software/hardware agents executing on various resources, e.g., computing devices, storage devices, data communication devices (e.g., routers, switches, etc.), and the like, within the LSAS engine's associated localized network in order to collect information about the status and operation of these various resources. For example, various measures of operation may be calculated and returned by the software/hardware agents including bandwidth availability/utilization, processor cycle utilization, storage utilization, throughput, error rates, data traffic pattern information, indications of detected attacks or intrusion attempts, e.g., access requests for accessing resources which are detected to be an attack or attempt to access data without sufficient access rights or permissions, and the like. The software/hardware agents may report information various hardware and software resources within the localized network.

The LSAS engine collects information from the agents in the localized network to capture a representation of a normal operating state of the localized network with regard to a plurality of numerical criteria-based indications of status. For example, when no significant error conditions are detected, no significant attacks or intrusions are detected, and the like, a baseline status of the localized network is collected from the agents to generate a set of numerical representations of statistical measures indicative of a normal state of the localized network, e.g., a normal statistical measure of bandwidth utilization, throughput, processor utilization, storage utilization, data packet payload size and timing for data communications to/from one or more resources, and the like, for the various resources in the localized network. This provides a multi-axis representation of the normal operating state of the localized network. It should be appreciated that such a multi-axis representation of the localized network may be generated on a global scale for the entire localized network, for portions of the localized network, for individual resources within the localized network, or any combination of the above.

As attacks or intrusions are attempted on one or more of the resources of the localized network, the agents will report information to the LSAS engine indicating a deviation from the normal operating state of the localized network. For example, bandwidth utilization may spike, processor cycle utilization may dramatically increase, particular traffic patterns, or patterns of access attempts may be detected, particular types of accesses may be reported, particular virus instances may be reported, and the like. In some illustrative embodiments, numerical criteria-based indications of status in the multi-axis representation of localized network may be reported that deviate from the normal operating state by an amount equal to or greater than a predetermined threshold. Mechanisms for identifying various computer based attacks or intrusions in computer networks are well known in the art and thus, a more detailed explanation is not presented herein. Any known or later developed mechanism for detecting an attack or intrusion may be used without departing from the spirit and scope of the present invention.

When an attack or intrusion is detected by an agent, or the LSAS engine based on metrics reported by the agents, an abnormal state may be present which requires a response in accordance with the illustrative embodiments to allow for segmentation, dilution, and scaffolding. With regard to the responsiveness of the LSAS engine to a detected attack or intrusion, the LSAS engine may implement segmentation mechanisms for segmenting the LSAS engine's associated initial segment into sub-segments and/or begin to isolate the initial segment from other segments associated with other LSAS engines. Isolation, or segmentation, of the initial segment is achieved through inter-segment and/or intra-segment bandwidth throttling at the LSAS engine which sends control signals to the routers/switches of the segment to control the throughput of the routers/switches and available bandwidth for various communications to the initial segment and/or portions of the initial segment.

Thus, when an attack or intrusion is detected within the segment associated with the LSAS engine, the bandwidth throttling is initiated so as to segment or isolate the affected portion of the segment from other portions of the computing system. In a cloud computing environment, for example, a first segment of the cloud computing system may experience an attack, such as a denial of service attack, port scanning, spoofing attack, "ping of death" attack, unauthorized access attempt, or any other type of passive or active attack, and the LSAS engine of that particular segment will then identify the location of the portion of the segment, or the segment as a whole, as the target of the attack and will proceed to gradually isolate the affected area through bandwidth throttling as is achieved through control signals sent to routers, switches, and other devices that control the flow of data traffic to and from the affected area of the segment, e.g., the particular computing device or devices affected. This is similar to the biological response to an attack on a biological system whereby the system responds by beginning to swell the affected biological area and thereby cut off or slow down the spread of the foreign matter into other areas of the biological system.

In addition, the LSAS engine may transmit notifications to other LSAS engines with which it is registered to inform those LSAS engines of the detected attack/intrusion and the resulting response initiated by the LSAS engine. Similarly, the LSAS engine may also receive notifications from other LSAS engines that are registered with it so as to become informed of attacks/intrusions occurring in other segments of the computing system. In addition to throttling bandwidth to/from portions of the segment associated with the LSAS engine, the LSAS engine, in response to receiving information that other segments to which it is coupled through an edge device are experiencing their own attacks/intrusions, may throttle bandwidth of data traffic flowing to/from the other segments experiencing such attacks/intrusions. As a result, the LSAS engine is able to segment, or isolate portions of its own segment from other portions of the segment as well as isolate or segment itself from other segments associated with other LSAS engines. Of course, segmentation or isolation of the segment from other segments may be performed even in situations where there is no attack or intrusion detected within the LSAS engines' own segment.

The particular amount of bandwidth throttling performed may be determined based on a variety of different characteristics of the detected attack or intrusion. These characteristics may include the nature of the attack, the origin of the attack, a determined degree of severity of the attack, and the like. For example, a first segment may be associated with Dallas, Tex. and the LSAS engine associated with this segment of the computing system may receive notifications from the LSAS engine associated with the San Antonio, Tex. segment indicating that the San Antonio segment is experiencing a large number of viruses, that the viruses are of the type that is known to originate from a source in North Korea, and that the severity of the effects of the virus as well as the number of instances indicate a relatively high severity. In such a case, the bandwidth of data traffic flowing between the Dallas segment and the San Antonio segment may be throttled to reduce the amount of data flowing between the two segments.

As the severity of the attacks/intrusions increase, the level of throttling may be increased so as to further segment or isolate the affected areas of the computing system. Thus, the LSAS engine may maintain a history of the status of the segment associated with the LSAS engine and the other segments associated with the other registered LSAS engines. The trend in status of the segment and other registered segments may be evaluated periodically to determine whether the throttling of the bandwidth should be increased or reduced. Corresponding control signals are sent to the computing devices, routers, switches, and other data traffic routing mechanisms to facilitate the increase/reduction in bandwidth to the affected segments, or portions of segments.

In addition to, or alternative to, a segmentation response to a detected attack or intrusion, the LSAS engine may perform a dilution response. The dilution response may take the form of a deliberate introduction of innocuous messages that dilute the amount of attack or intrusion based messages processed by the segment or computing system thereby slowing down the ability of the attacker. The introduction of innocuous messages reduces the available bandwidth to attack or intrusion messages and thus, dilutes the attack or intrusion messages. The LSAS engine may generate such dilution data packets or messages that are processed by the segment resources in a normal manner but which do not affect the state of the segment resources other than to dilute the attack or intrusion traffic.

The dilution response may also take the form of sandboxing and/or utilizing a honeypot mechanism. Sandboxing is a process by which data traffic is isolated to a defined set of processes that do not adversely affect the segment or computing system. A sandbox is a security mechanism for separating or separating a portion of the computing system from other portions of the computing system so as to minimize the potential spread of attack or intrusion. For example, the sandbox may comprise processes that do not perform any actual work in the computing system but may appear to be performing actual processes to external processes that may be a source of the attack or intrusion. For example, if the attack or intrusion is directed to a segment tasked with controlling a ventilation fan of a facility, the sandbox may virtually represent the ventilation fan and appear to the externa processes as if the actual ventilation fan is being controlled or accessed when in fact the virtualized ventilation fan is actually being manipulated and no real effect on the computing system is actually being performed. In this way, the attack is quarantined and kept from affecting the actual resources of the computing system.

In a similar manner, the dilution response may utilize a honeypot mechanism in which a "honeypot" of data, simulated systems, or the like, may be established and traffic detected to be part of an attack or intrusion is redirected to the "honeypot" which is one or more pseudo-data data structures. The pseudo-data data structures resemble actual data but in fact present fake or pseudo-data that will not negatively affect the organization associated with the data processing system if the pseudo-data is accessed by virtue of an attack or intrusion. The use of a honeypot is a deception trap designed to entice an attacker into attempting to compromise the honeypot rather than other resources of the computing system where actual data is present. When deployed correctly, the honeypot serves as an early-warning and advanced security surveillance tool, minimizing the risks of attacks on the other resources of the segment or computing system.

A graduated approach to performing the dilution response may be utilized in a similar manner to the mechanisms for throttling the bandwidth both within and between segments of the computing system. The LSAS engine may begin with dilution of the traffic to/from the affected sub-segment or the segment as a whole by introducing innocuous data packets or messages into the data traffic. As the LSAS engine of the segment continues to monitor the status of its own segment and other registered segments, if the characteristics of the attack indicate an increase in the severity of the attack, the dilution may be performed by switching the data communication traffic to a sandbox traffic channel where the data packets or messages are handled by a defined set of sandbox processes that do not affect the state of the other segment resources or computing system resources. Alternatively, the traffic may be redirected to a honeypot data set or set of processes that comprise fake data or virtualized processes that do not affect the remainder of the segment or computing system and do not provide valid data.

Whether using a segmentation response, dilution response, or both, the mechanisms of the LSAS engines may further provide mechanisms for providing a scaffolding response. The scaffolding response provides mechanisms for providing post-event countermeasures to regain normal operation of the segment, sub-segment, or computing system. These mechanisms may include an alternate communication channel that is maintained in reserve for use in case an attack or intrusion is detected. In the case of a detected attack or intrusion, and the initiation of the segmentation and/or dilution responses, the LSAS engine may enable the alternate communication channel through which control messages may be transmitted from the LSAS engine and other recovery systems to access segment resources and regain normal operation of the resources.

As noted above, the mechanisms of the illustrative embodiments utilize specifically configured computing devices, routers, switches, dedicated hardware and/or software devices, or other data processing systems, to perform the operations for providing segmentation, dilution, and/or scaffolding response to a detected attack or intrusion, such as via a LSAS engine. These computing devices, routers, switches, dedicated hardware/software devices, or other data processing systems, may comprise various hardware elements which are specifically configured, either through hardware configuration, software configuration, or a combination of hardware and software configuration, to implement one or more of the systems/subsystems described herein.

FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described herein with regard to the LSAS engine.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
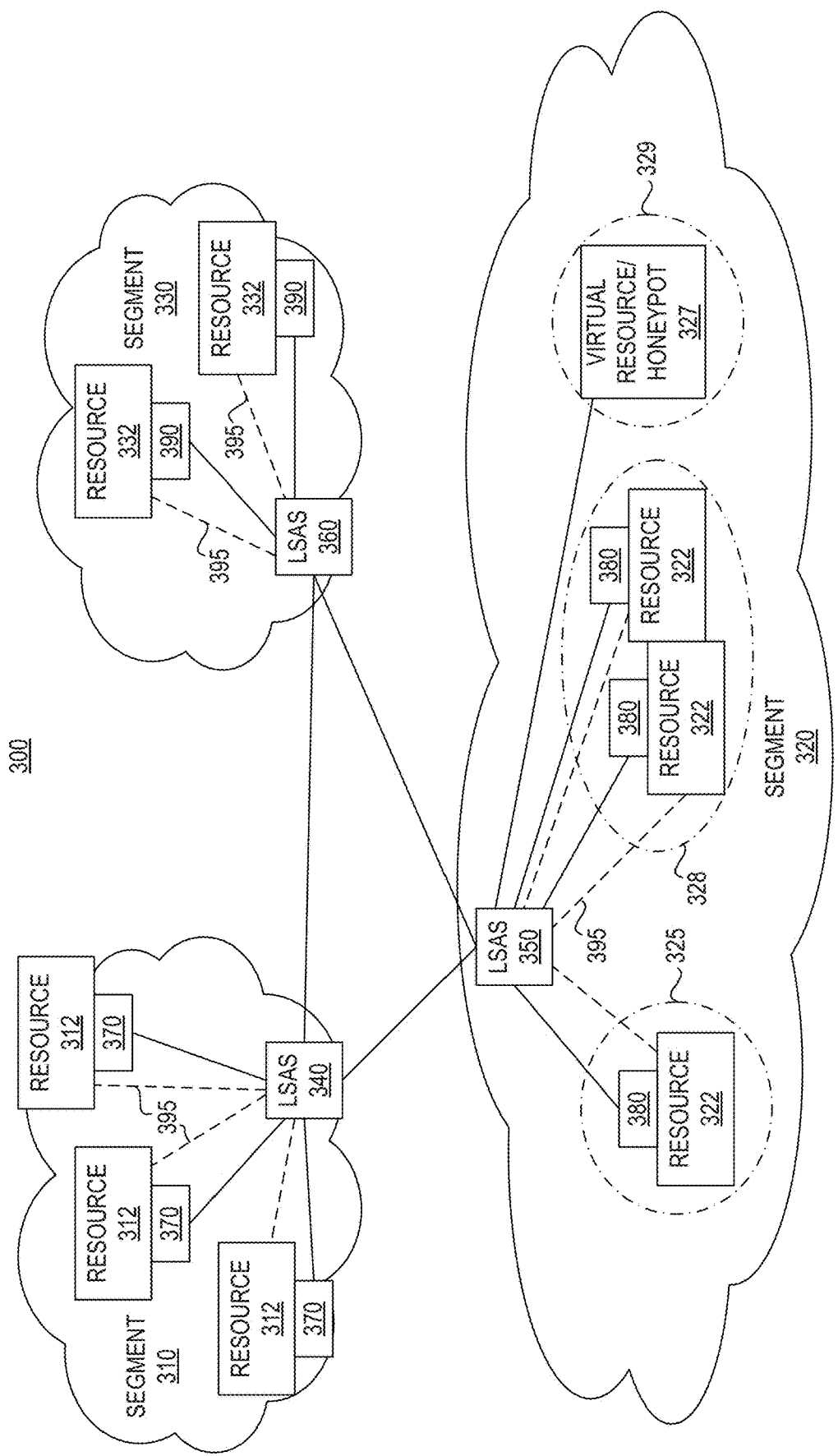
FIG. 3 is an example diagram illustrating a segmented distributed data processing system implementing one or more local segment analysis and security (LSAS) engines in accordance with one illustrative embodiment.

FIG. 3 is an example diagram illustrating a segmented distributed data processing system implementing one or more local segment analysis and security (LSAS) engines in accordance with one illustrative embodiment. In accordance with the illustrative embodiments, a distributed data processing system 300 is provided which may be segmented into an initial set of segments 310, 320, and 330 based on various segmentation characteristics. For example, the distributed computing system 300 may be a cloud computing system in which segmentation of the cloud computing system into segments 310, 320, and 330 is based on geographic regions, organizational departments, virtual segmentation criteria, such as types of cloud computing services provided, types of cloud computing resources provided, virtualized areas of responsibility, or any other suitable real-world or virtualized segmentation characteristics.

As one example, a cloud computing system may be segmented into a first segment 310 for the "Eastern United States", a second segment 320 for the "Central United States Region", and a third segment 330 for the "Western United States." In another example, a cloud computing system may be segmented into "financial services," "backup storage services," "social networking services," "cognitive computing services," and the like. Of course, any combination of segments 310, 320, and 330 based on virtual and/or real-world segmentation characteristics may be utilized, e.g., "financial services for the Eastern United States". In addition, each segment 310, 320, and 330 may be further segmented into sub-segments based on desired configurations such that various levels of segmentation are made possible.

Each segment, and/or sub-segment, of the distributed computing system 300 has associated with it at least one LSAS engine 340, 350, 360 executing on one or more computing devices associated with the segment or sub-segment. The LSAS engine 340, 350, 360 operates in conjunction with software/hardware agents 370-390 associated with the various computing resources of a corresponding segment or sub-segment of the distributed data processing system 300. The agents 370-390 monitor the operation of the computing resources 312, 322, 332 and generate data representing the operational characteristics of the computing resources 312, 322, 332, such as operational statistics, e.g., numbers of errors encountered, throughput, storage capacity utilization, processor utilization, access requests, bandwidth utilization, numbers of detected viruses and their types/sources, or any other operational characteristic or statistical measure. In some illustrative embodiments, the agents 370-390 further comprise mechanisms for identifying and reporting intrusions or violations, such as viruses, unauthorized access attempts, or various types of attacks on the segments or sub-segments of the distributed data processing system, such as may be identified by analyzing traffic patterns to/from the computing resources 312, 322, 332, for example. The agents 370-390 may report such operational characteristics, statistical measures, and indications of intrusions, violations, or attacks to the corresponding LSAS engine 340, 350, 360 for the particular sub-segment and/or segment.

The distributed computing system 300 initially runs without any intrusion, violation or attack alert or notification being generated but with the agents reporting operational characteristics/statistics for the normal operation of their respective computing resources 312, 322, 332 to the corresponding LSAS engine 340, 350, 360. For a particular segment or sub-segment, the LSAS engine, e.g., LSAS engine 340, maintains an inventory of the ongoing data transmissions between the segment resources and other computing devices (e.g., client computing devices), data accesses, bandwidth utilization, and other logging of operations performed by the computing resources 312 of the sub-segment/segment of the distributed data processing system 300, as well as other operational characteristics and statistical measures indicative of a proper operation of the segment of the distributed data processing system 300. This essentially gives a multi-dimensional numerical representation of baseline status indicators that are indicative of a proper operation of the sub-segment or segment 310, 320, 330 of the distributed data processing system 300 against which violations corresponding to attacks or intrusions may be measured. In one illustrative embodiment, as the numerical status indicators increase in value, the indication is that there is a problematic computing environment present and thus, higher values are indicative of higher priority issues corresponding to likely attacks or intrusions that need to be evaluated and rectified.

At some point during operation of the distributed data processing system 300, errors in operation of one or more of the computing resources 312, 322, 332 may be detected, data traffic patterns indicative of intrusions, violations, or attacks, or the like may be detected by one or more agents 370-390 and reported to the corresponding LSAS engine 340-360. For example, as operational characteristics/statistics, traffic pattern operational characteristics/statistics, and the like, are detected and reported by the agents 370-390, this information may be compared to the baseline operational information retained by the corresponding LSAS engine 340-360. If one or more discrepancies are detected and these discrepancies are equal to or above one or more predetermined thresholds, then a determination may be made that the sub-segment or segment 310, 320, 330 is encountering a problematic condition, has encountered a virus, or is under attack. For example, data traffic may be analyzed by the agents 370-390 and/or LSAS engine 340-360 to determine if the data packet sizes, timing, apparent payloads, and the like, are consistent with the information maintained regarding the baseline or normal operation of the computing resources 312, 322, 332 of the sub-segment or segment 310, 320, 330. If these operational characteristics are not consistent, then a potential intrusion, violation, or attack may be identified.

The LSAS engines 340-360 operate to monitor operations and conditions within its own associated segment 310, 320, 330 and communicate with LSAS engines 340-360 associated with other segments 310, 320, 330. Thus, for example, LSAS engine 310 monitors operations and conditions as reported by the agents 370 associated with computing resources 312 in segment 310, whereas LSAS engine 350 monitors operations and conditions as reported by agents 380 associated with computing resources 322 in segment 320. Moreover, the LSAS engines 340, 350, and 360 may communicate with each other to inform each other of the current status of their respective segments 310, 320, 330. The LSAS engines 340, 350, and 360, during a configuration operation, may register with other LSAS engines 340, 350, 360 with which they are communicatively coupled. The configuration information is stored in the LSAS engines 340-360 and provides information about the various segments 310, 320, 330, i.e. the segments associated with the LSAS engines 340-360 themselves and the other segments 310, 320, 330 associated with other LSAS engines 340-360.

As noted above, the monitoring of the segments 310, 320, and 330 by the corresponding LSAS engines 340-360 may comprise interfacing with software/hardware agents 370-

390 executing on, or in connection with, various segment computing resources 312, 322, and 332, e.g., computing devices, storage devices, data communication devices (e.g., routers, switches, etc.), and the like, within the LSAS engine's associated localized network or segment 310, 320, 330 in order to collect information about the status and operation of these various resources 312, 322, and 332. Various measures of operation may be calculated and returned by the software/hardware agents 370-390 including bandwidth availability/utilization, processor cycle utilization, storage utilization, throughput, error rates, data traffic pattern information, indications of detected attacks or intrusion attempts, e.g., access requests for accessing resources which are detected to be an attack or attempt to access data without sufficient access rights or permissions, and the like. The software/hardware agents 370-390 may report information about the various hardware and software resources within the localized network.

The LSAS engine, e.g., LSAS engine 350, collects information from the agents 380 in the localized network or segment 320 to capture a representation of a normal operating state of the localized network or segment 320 with regard to a plurality of numerical criteria-based indications of status, thereby providing a multi-axis representation of the normal operating state of the localized network or segment 320.

As attacks or intrusions are attempted on one or more of the resources 322 of the localized network or segment 320, the agents 380 will report information to the LSAS engine 350 indicating a deviation from the normal operating state of the localized network or segment 320. In some illustrative embodiments, numerical criteria-based indications of status in the multi-axis representation of localized network/segment 320 may be reported that deviate from the normal operating state by an amount equal to or greater than a predetermined threshold set in the configuration information of the LSAS engine 350. It should be appreciated that there may be multiple different thresholds established for different types of metrics and for different levels of severity of attack or intrusion so as to trigger appropriate responses by the LSAS engine 350 to perform segregation, dilution, and scaffolding. The LSAS engine 350 and/or agents 380 may utilize any known or later developed mechanism for detecting an attack or intrusion as a basis for reporting such metrics and identifying the existence of a situation in which the segment 320 is the target of an attack or intrusion.

When an attack or intrusion is detected by an agent 380, or the LSAS engine 350 based on metrics reported by the agents 380, an abnormal state may be present which requires a response in accordance with the illustrative embodiments to allow for segmentation, dilution, and scaffolding. With regard to the responsiveness of the LSAS engine 350 to a detected attack or intrusion, the LSAS engine may implement segmentation mechanisms for segmenting the LSAS engine's associated initial segment 320 into sub-segments 325 and 328, for example, to isolate a portion of the segment 320 that is the target of the detected attack from other portions of the segment 320, e.g., isolate sub-segment 325 from sub-segment 328. Moreover, the LSAS engine 350 may operate to isolate the initial segment 320 from other segments 310 and 330 associated with other LSAS engines 340, 360. The isolation, or segmentation, of the initial segment 320 is achieved through inter-segment and/or intra-segment bandwidth throttling at the LSAS engine 350 which sends control signals to the routers/switches (not shown) of the segment 320 to control the throughput of the routers/switches and available bandwidth for various communications to the initial segment 320 and/or portions of the initial segment 320, e.g., sub-segment 325. For example, bandwidth of communications to/from sub-segment 325, which is determined to be the target of an attack in segment 320, across one or more identified intra-segment communication channels, may be throttled so as to reduce the bandwidth of traffic flowing to and from the sub-segment 325, thereby gradually isolating the sub-segment 325 from other portions of segment 320 and other segments 310, 330. As mentioned above, this is similar to the biological response to an attack on a biological system whereby the system responds by beginning to swell the affected biological area and thereby cut off or slow down the spread of the foreign matter into other areas of the biological system.

In addition, the LSAS engine 350 may transmit notifications to other LSAS engines 340 and 360 with which it is registered to inform those LSAS engines 340, 360 of the detected attack/intrusion and the resulting response initiated by the LSAS engine 350. Similarly, the LSAS engine 350 may also receive notifications from other LSAS engines 340, 360 so as to become informed of attacks/intrusions occurring in other segments 310, 330. In addition to throttling bandwidth to/from portions of the segment 320 associated with the LSAS engine 350, the LSAS engine 350, in response to receiving information that another segment, e.g., segment 310, to which it is communicatively coupled, e.g., through an edge device and one or more data networks, is experiencing an attack/intrusion, may throttle bandwidth of data traffic flowing to/from the other segment 310 that is experiencing the attack/intrusion, i.e. throttling the bandwidth of an identified inter-segment communication channel with the other segment 310. As a result, the LSAS engine 350 is able to segment, or isolate, portions of its own segment 320 from other portions of the segment 320 as well as isolate or segment itself from other segments 310, 330 associated with other LSAS engines 340, 360.

The particular amount of bandwidth throttling performed by the LSAS engine 350 may be determined based on different characteristics of the detected attack or intrusion including, for example, the nature of the attack (e.g., type of virus or access request pattern detected), the origin of the attack (e.g., as may be obtained from a database of information regarding various attacks, such as a virus definition data structure or the like), a determined degree of severity of the attack (e.g., a representation of the amount of damage that the attack will cause if successful), and the like. As the severity of the attacks/intrusions increase, the level of throttling may be increased so as to further segment or isolate the affected areas of the computing system. Thus, the LSAS engine 350 may maintain a history of the status of the segment 320 associated with the LSAS engine 350 and the other segments 310, 330 associated with the other registered LSAS engines 340, 360. The trend in status of the segment 320 and other registered segments 310, 330 may be evaluated periodically to determine whether the throttling of the bandwidth should be increased or reduced. Corresponding control signals are sent to the computing devices, routers, switches, and other data traffic routing mechanisms to facilitate the increase/reduction in bandwidth to the affected segments 310, 320, 330, or portions of segments, e.g., sub-segments 325, 328.

As discussed previously, the LSAS engine 350 may also, in response to a detected attack or intrusion, perform a dilution response to dilute the traffic that is part of the attack and slow the ability of the attack to affect the segment 320 and spread to other segments 310, 330 of the system 300. The dilution response may take the form of a deliberate introduction of innocuous messages (data packets) that dilute the amount of attack or intrusion based messages (data packets) processed by the segment 320, thereby slowing down the ability of the attacker. The introduction of innocuous messages (data packets) reduces the available bandwidth to attack or intrusion messages and thus, dilutes the attack or intrusion messages. The LSAS engine 350 may generate such dilution data packets or messages that are processed by the segment resources 322 in a normal manner but which do not affect the state of the segment resources 322 other than to dilute the attack or intrusion traffic.

The dilution response may also take the form of sandboxing and/or utilizing a honeypot mechanism. As shown in FIG. 3, the segment 320 may comprise a virtual sub-segment 329 representing a sandbox or honeypot with virtual resource processes/honeypot data structures 327. The LSAS 350 may redirect suspect data packets or messages such that the suspect traffic is directed to the sandbox/honeypot 329 along an alternative communication channel associated with the sandbox/honeypot 329. Since the resource processes are virtualized, and/or the honeypot data representing false but enticing data, does not affect the operation of the other actual resources of the segment 320, the attack is essentially quarantined to the virtual sub-segment 329 while corrective action is taken to thwart the attack.

A graduated approach to performing the dilution response may be utilized by the LSAS engine 350 in a similar manner to the graduated mechanisms for throttling the bandwidth both within and between segments 310, 320, 330. The LSAS engine 350 may begin with dilution of the traffic to/from the affected sub-segment 325 or the segment 320 as a whole by introducing innocuous data packets or messages into the data traffic. As the LSAS engine 350 continues to monitor the status of its own segment 320 and other registered segments 310, 330, if the characteristics of the attack indicate an increase in the severity of the attack, the dilution may be performed by switching the data communication traffic to a sandbox traffic channel associated with the virtual sub-segment 329, where the data packets or messages are handled by a defined set of sandbox processes 327 that do not affect the state of the other segment resources 322. Alternatively, the traffic may be redirected to a honeypot data set or set of processes 327 that comprise falsified data or virtualized processes that do not affect the remainder of the segment 320 and do not provide valid data.

As discussed above, one of the aspects of the LSAS engine 340-360 is the ability to base the determination as to whether to begin "swelling" type responses to a detected attack or intrusion based not only upon its own segment's reported status, but also the statuses of the other segments associated with other LSAS engines. Thus, the LSAS engine 340-360 analyzes an internal condition, e.g., its own associated segment, and a condition of other parts of the data processing system, e.g., other segments registered with the LSAS engine 340-360. In some illustrative embodiments, the other segments and corresponding LSAS engines 340-360 whose states are analyzed may be specified in configuration information for the LSAS engine 340-360 and may, or may not, encompass all of the other segments of the data processing system. That is, in a large organization having a correspondingly large distributed data processing system, an LSAS engine 340-360 may only analyze its own segment's status and that of "neighboring" segments. A "neighbor" segment is one that is geographically, organizationally, or computer system topologically defined as being adjacent or directly connected to the current LSAS engine and its associated segment. Thus, for example, within a geographically distributed data processing system, a segment associated with India may not be a "neighboring" segment to a segment associated with the Eastern United States, but may be a "neighboring" segment to a segment associated with South East Asia. Whether a segment is "neighboring" or not of another segment will be dependent upon the particular configuration of the data processing system.

Another aspect of the LSAS engines is the ability to gradually intensify the "swelling" response in response to an increase severity of the attack or intrusion on the LSAS engine's associated segment and/or other segments that may directly affect the LSAS engine's associated segment, e.g., "neighboring" segments. The LSAS engines 340-360 may be configured with logic for defining the manner and conditions under which the segmentation and dilution responses are performed and the responses are increased. Thus, for example, various thresholds or levels of severity of attacks, types of attacks, sources of attacks, and other attack characteristics, may be defined with corresponding responses being associated with these thresholds. For example, a first threshold may be established for a low severity attack within the LSAS engine's own segment that indicates that a first level of segmentation response should be initiated that narrows the bandwidth available to the communication channels associated with the affected segment or sub-segment. A second threshold may be established for a low severity attack within the segment associated with the LSAS engine coupled with another low severity attack in a "neighboring" segment which causes a narrowing of the intra-segment bandwidth to the affected sub-segment and a narrowing of the inter-segment bandwidth with the communication channels to the other affected segment. Still further, a third threshold may be established based on the source and type of the attack, e.g., if the attack is a denial of service attack, and the attack is known to originate from a geographic location of interest, then a more substantial narrowing of the bandwidth of inter-segment communication channels may be performed coupled with a dilution response on inter-segment communication channels. Any combination of attack characteristics may be paired with a corresponding threshold and one or more "swelling" responses and intensities of responses without departing from the spirit and scope of the illustrative embodiments.

Whether using a segmentation response, dilution response, or both, the mechanisms of the LSAS engines 340-360 may further provide mechanisms for providing a scaffolding response, as previously noted above. The scaffolding response provides mechanisms for providing post-event countermeasures to regain normal operation of the segment, sub-segment, or computing system. These mechanisms may include an alternate communication channel 395 that is maintained in reserve for use in case an attack or intrusion is detected. In the case of a detected attack or intrusion, and the initiation of the segmentation and/or dilution responses, the LSAS engine 350 may enable the alternate communication channel 395 through which control messages may be transmitted from the LSAS engine 350, and other recovery systems (not shown), to access segment resources 322 and regain normal operation of the resources 322. For example, in the case of a denial of service attack, control messages may be sent across this alternate communication channel 395 to cause the resource 322 to reboot or otherwise clear out its queues of data packets or messages and configure the resource 322 to block or otherwise avoid the denial of service attack.

Figure 4:
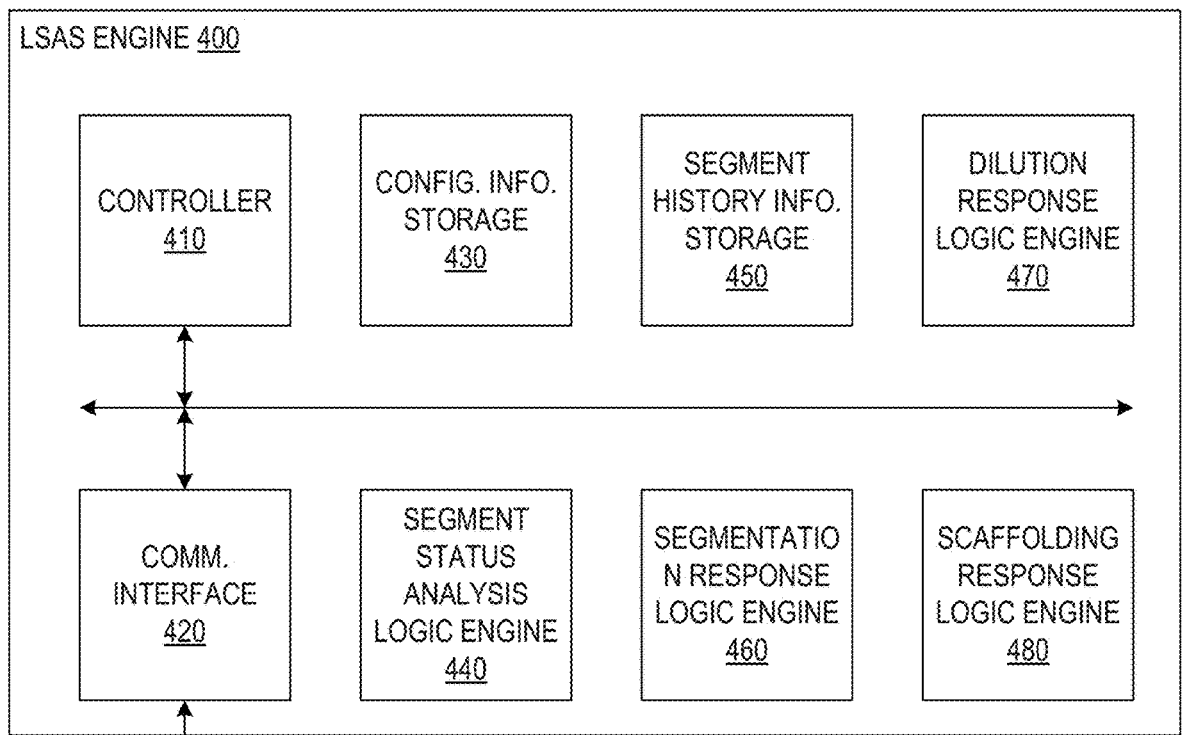
FIG. 4 is an example block diagram of a local segment analysis and security (LSAS) engine in accordance with one illustrative embodiment.

FIG. 4 is an example block diagram of a local segment analysis and security (LSAS) engine in accordance with one illustrative embodiment. As shown in FIG. 4, the LSAS engine 400 comprises a controller 410, a communications interface 420, configuration information storage 430, segment status analysis logic engine 440, segment history information storage 450, segmentation response logic engine 460, dilution response logic engine 470, and scaffolding response logic engine 480. The controller 410 controls the overall operation of the LSAS engine 400 and orchestrates the operation of the other elements 420-480 of the LSAS engine 400 so as to achieve the desired results for analyzing the status of one or more segments of a data processing system, detecting statuses indicative of an attack or intrusion on a segment or sub-segment of the data processing system, and providing a "swelling" response to the detected attack or intrusion by performing a segmentation, dilution, and/or scaffolding response. Any operations described herein that are not described as being performed by one or more of the other elements 420-480 are performed by the controller 410.

The communications interface 420 provides a data communication pathway through which the LSAS engine 400 receives data and information from agents deployed in the LSAS engine's associated segment, sub-segment, or the like, and further receives data from other LSAS engines 400. In addition, the communications interface 420 provides a data communication pathway through which the LSAS engine 400 is able to send control signals, data packets, and/or messages to other elements of the associated segment to facilitate the performance of an appropriate "swelling" response to a detected attack or intrusion. For example, the LSAS engine 400 may send control messages to routers, switches, or other data traffic flow control mechanisms in the segment to cause the bandwidth of channels associated with a sub-segment that is detected as being the target of an attack, to become narrower by reducing the available bandwidth and/or introducing innocuous messages to dilute the traffic flowing through the channels. As another example, the communication interface 420 may further comprise one or more reserved channels used by the LSAS engine to send control messages to facilitate regaining control of segment resources in the event that an attack on those resources is detected.

Configuration information storage 430 stores the configuration information, neighboring segment data structures, threshold/response mapping data structures, defined response rule sets, and any other configuration information that provides the basis for configuring the LSAS engine 400 to operate in a manner desired by the particular implementation. In particular, the configuration information storage 430 comprises data structures that specify the other LSAS engines and their corresponding segments that are considered to be "neighbors" to the current segment associated with the current LSAS engine 400. This may be a designation of all other segments or only a subset of the segments of the data processing system. In this way, when status messages are sent to the LSAS engine 400 from other LSAS engines and received via the communication interface 420, the controller 410 can determine if the status messages are ones of interest to the LSAS engine 400 as only those associated with neighbor segments need to be processed and the information stored in the segment history information storage 450.

In addition, the configuration information storage 430 stores data structures defining the thresholds for attacks/intrusions and the corresponding "swelling" response to initiate in response to the conditions of these thresholds being met. The thresholds may be specified in terms of numeric segment status metrics (e.g., bandwidth utilization, processor utilization, storage utilization, error rates, etc.) or other characteristics of an attack including, but not limited to, a type of attack (e.g., denial of service type attack), a source of an attack (e.g., a particular geographical region as a source), a determined severity of the effects of the attack (e.g., loss of service or breach of access controls), and the like. The thresholds are preferably paired with a corresponding response that indicates the aspects of a "swelling" response to be employed and the intensity of these aspects of the response, e.g., segment the affected sub-segment by narrowing the bandwidth by 30% and diluting the data traffic by 25% through the injection of innocuous messages. In general, this threshold and response information defines the severity of the attack and the severity of the "swelling" response to be employed. This information may be updated in a manner similar to virus definition updates in which information about existing or new threats may be updated on a periodic basis using automated and/or manual processes.

The segment status analysis logic engine 440 operates to process segment status information obtained from agents deployed in the LSAS engine's associated segment or sub-segment as well as status information for other segments or sub-segments associated with other LSAS engines, as received via the communications interface 420. The segment status analysis logic engine 440 may receive segment status metric information from the agents deployed in association with computing resources of the segment, such as bandwidth utilization, processor utilization, numbers of detected viruses, error rates, traffic pattern information, and the like. The segment status analysis logic engine 440 may then analyze this segment status metric information and evaluate it against a baseline normal operation representation of the segment, as may be stored in the segment history information storage 450, to determine whether an attack or intrusion into the segment, or a sub-segment, is detected as well as the characteristics of the attack or intrusion including the type of attack, source of the attack, and severity of the attack. In addition, the segment status analysis logic engine 440 may analyze information received from other LSAS engines to determine the conditions of neighboring segments or sub-segments, trends in the status of neighboring segments or sub-segments (e.g., getting better (less severe conditions) or getting worse (more sever conditions)), and how these other statuses may affect the status of the LSAS engine's own segment. This may include intensifying the "swelling" response by performing a segmentation or dilution response on communication channels associated with these other segments or sub-segments. The particular thresholds, mappings of status with responses, and the like, may be done by the segment status analysis logic engine 440 utilizing the configuration information stored in the configuration information storage 430.

The segment history information storage 450 stores a baseline set of status metrics for the segment or sub-segment associated with the LSAS engine 400 which provides a multi-dimensional or multi-axis representation of a normal operational status of the segment or sub-segment. In addition, the segment history information storage 450 stores a moving window of historical status information for neighboring segments or sub-segments as reported from other LSAS engines. The moving window essentially keeps status information for other segments/sub-segments that is within a predetermined amount of time of the current time. This historical information allows for trend analysis to be performed by the segment status analysis logic 440. In some illustrative embodiments, a moving window of historical information may also be maintained for the segment/sub-segment associated with the LSAS engine 400 so as to allow similar trend analysis to be performed with regard to the segment/sub-segment associated with the LSAS engine 400. As noted above, the results of the processing of this historical information may be combined with current status information for the segment/sub-segment and neighboring segments/sub-segments to determine what responses to trigger.

The segmentation response logic engine 460 provides the logic for implementing segmentation responses in response to triggering of the segmentation response by the results of the analysis performed by the segment status analysis logic 440. As noted above, the segmentation response may comprise bandwidth narrowing both from an intra-segment and inter-segment viewpoint. Similarly, the dilution response logic engine 470 provides the logic for implementing dilution responses in response to triggering of the segmentation response by the results of the analysis performed by the segment status analysis logic 440. As noted above, the dilution response may comprise injection of innocuous messages to dilute the attack traffic along channels of affected segments or sub-segments, as well as sandboxing or honey potting as an option. Each of these response types may be performed in a graduated manner based on the determined level of severity of the attack or trends in severity of the attacks.

The scaffolding response logic engine 480 provides the logic for implementing the scaffolding response in response to triggering by the segment status analysis logic 440. As attack severity increases and thresholds are met, some of the responses may be to initiate recovery operations to recover control of particular segment resources. As a result, the scaffolding response logic engine 480 will be triggered to initiate control communications across alternative or reserve communication channels with the segment resources to cause the corresponding segment resources to reboot, or otherwise recover to a state where they will not be experiencing the negative effects of the attack.

Figure 5:
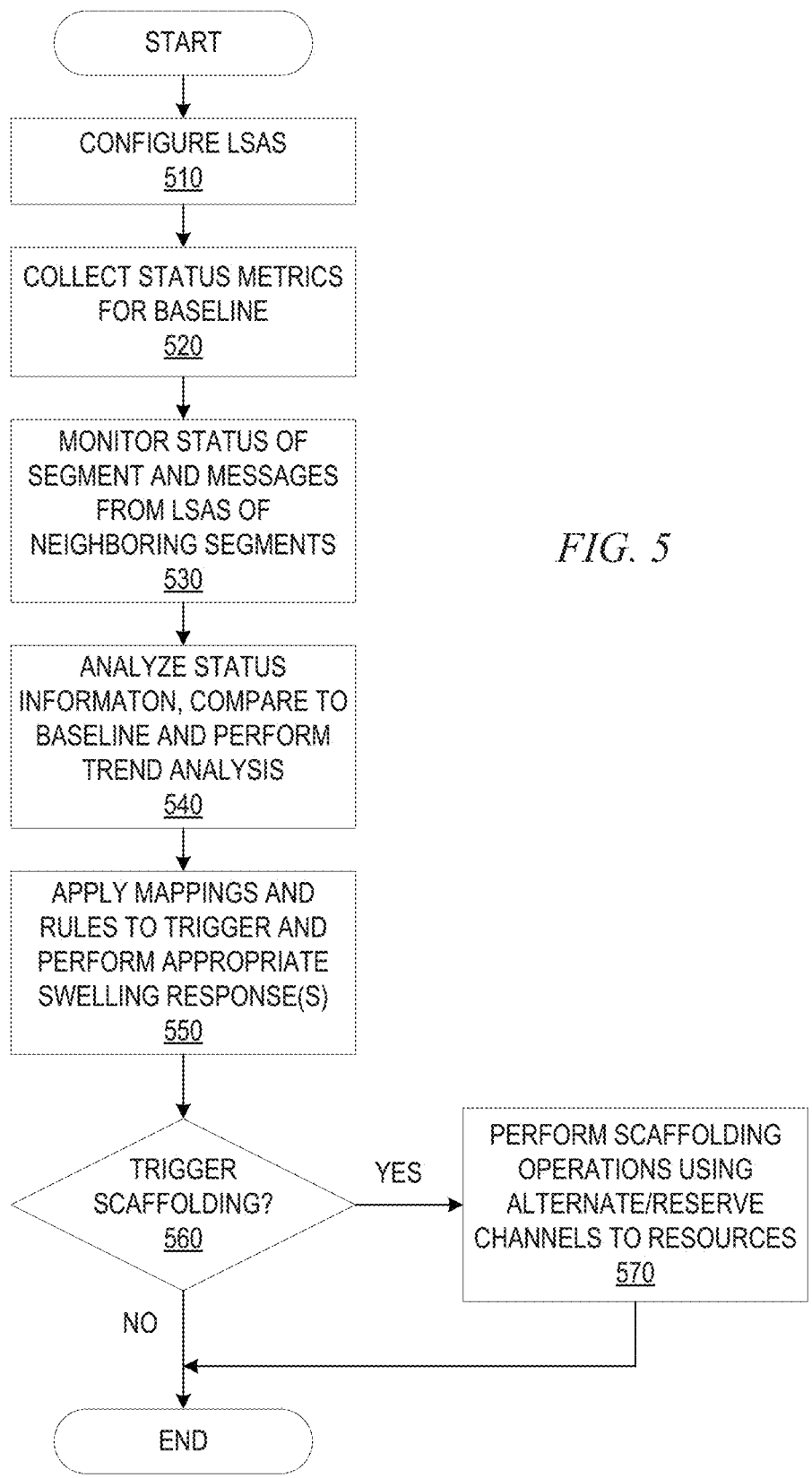
FIG. 5 is a flowchart outlining an example operation of a LSAS engine in accordance with one illustrative embodiment.

FIG. 5 is a flowchart outlining an example operation of a LSAS engine in accordance with one illustrative embodiment. As shown in FIG. 5, the operation starts with the configuring of the LSAS engine with regard to segment status conditions, thresholds, corresponding responses, mapping data structures for mapping segment status conditions and thresholds to corresponding responses, rules, and the like, as well as information regarding neighboring segments (step 510). The LSAS engine operates in conjunction with agents deployed in association with segment resources to collect multi-dimensional or multi-axis segment status metrics indicative of a baseline or normal operational state of the segment (step 520). The status of the segment associated with the LSAS engine and status messages from other LSAS engines associated with neighboring segments is monitored (step 530). The status information is analyzed and compared to the baseline operational state of the segment, trend analysis is performed (step 540), and the mapping data structures and rules are applied to the results of the analysis to trigger any applicable swelling response (step 550). The swelling response may be to implement a segmentation response and/or dilution response as previously described above, or to intensify a previously implemented response. In some cases, the graduated response may involve implementing additional responses based on the results of the analysis indicating a worsening trend, e.g., increasing the segmentation response to reduce bandwidth while also implementing a sandboxing dilution response.

A determination is made, based on the results of the analysis and application of mapping data structures and rules, whether a scaffolding response should be initiated to recover control of an affected segment's resources (step 560). If not, the operation terminates. If so, the operation initiates a scaffolding response by initiating control communications to segment resources across reserved or alternative communication channels (step 570). The operation then terminates. It should be appreciated that while FIG. 5 shows the operation terminating, the operation may be repeated on a periodic or continuous basis so as to repeatedly determine an appropriate swelling response or increase/decrease in the intensity of the swelling response as changes in the segment and neighboring segment statuses change dynamically.

Thus, the illustrative embodiments provide mechanisms for implementing security responses to detected attacks or intrusions that model a biological system's response to a foreign intrusion into the biological system. In particular, the illustrative embodiments model the "swelling" response of a biological system by providing mechanisms for implementing segmentation, dilution, and scaffolding of the affected areas of the data processing system in an analogous manner to that of a swelling reaction by a biological system. Thus, the efficiencies of a biological system for dealing with foreign intrusion or attacks are made possible in a data processing system.

As mentioned above, one type of distributed data processing system in which the various aspects of the illustrative embodiments may be implemented is a cloud computing system. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
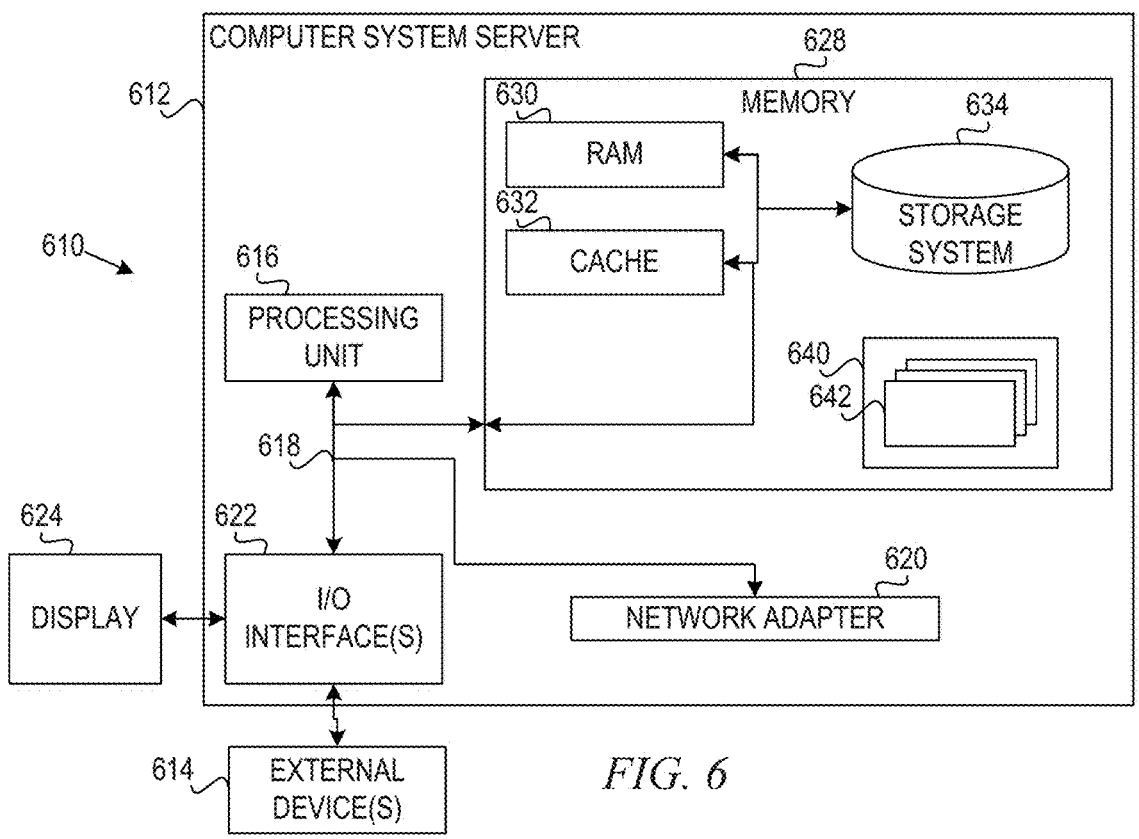
FIG. 6 depicts a cloud computing node according to an illustrative embodiment.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
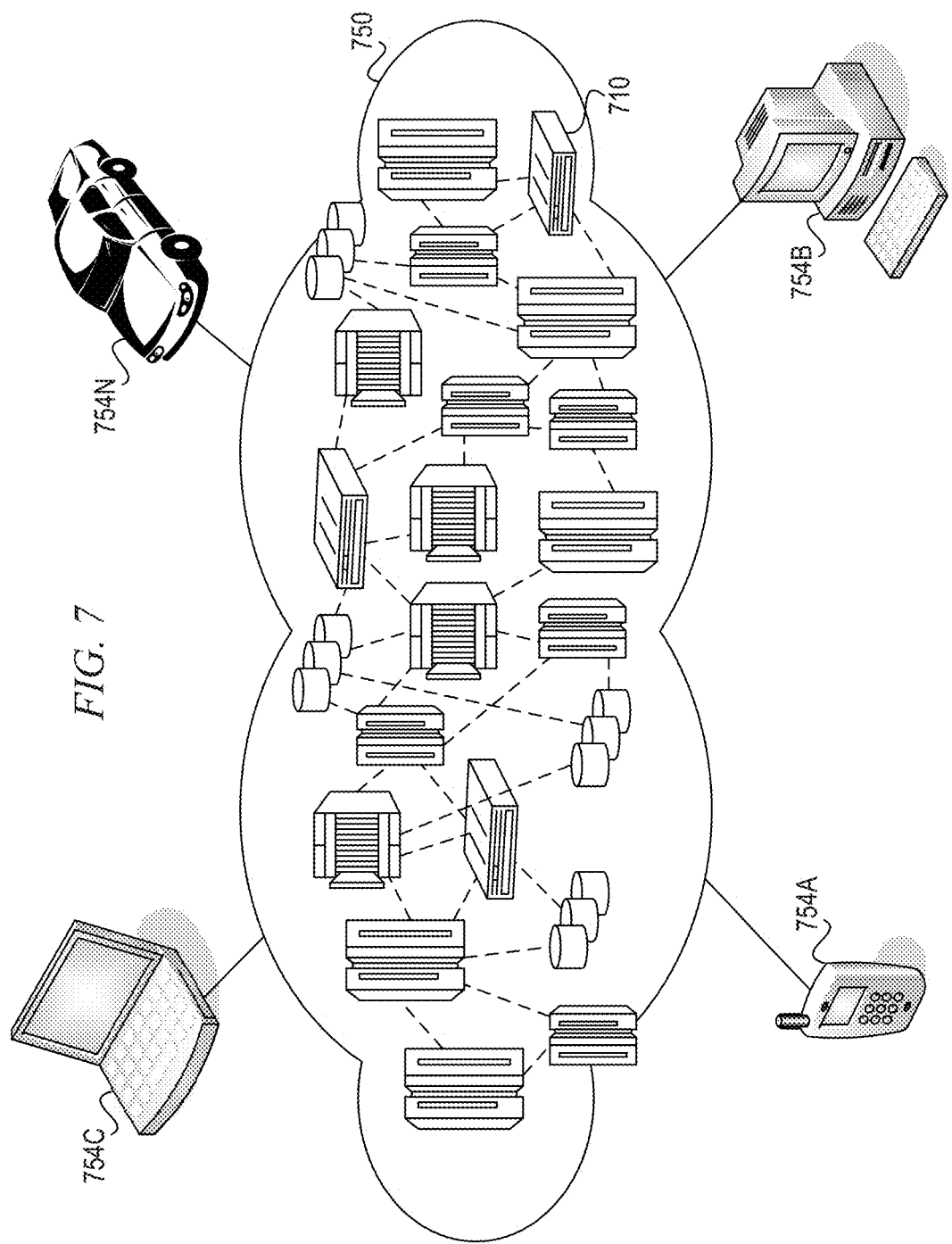
FIG. 7 depicts a cloud computing environment according an illustrative embodiment.

Referring now to FIG. 7, an illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 10 and cloud computing environment 750 can communicate with any type of computerized device over any type of network and/or network addressable connection (e.g., using a web browser).

Figure 8:
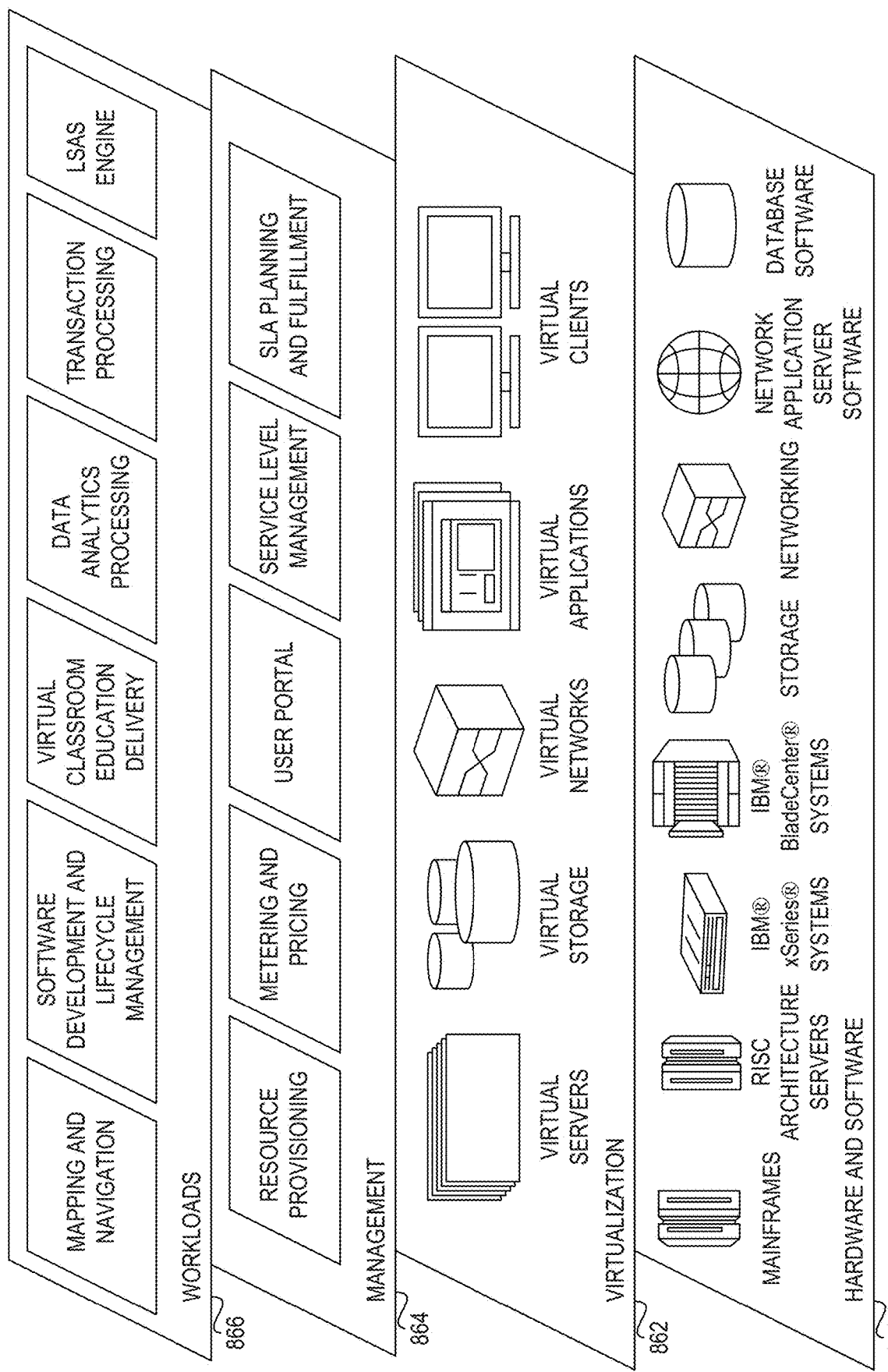
FIG. 8 depicts abstraction model layers according to an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software (IBM, zSeries, pSeries, xSeries, BladeCenter, Web Sphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the LSAS engine mechanism previously described above for handling segment analysis and security functions modeled in accordance with the "swelling" response of biological systems.

As noted above, the mechanisms of the illustrative embodiments utilize specifically configured computing devices, routers, switches, dedicated hardware and/or software devices, or other data processing systems, to perform the operations for providing segmentation, dilution, and/or scaffolding response to a detected attack or intrusion, such as via a LSAS engine. These computing devices, routers, switches, dedicated hardware/software devices, or other data processing systems, may comprise various hardware elements which are specifically configured, either through hardware configuration, software configuration, or a combination of hardware and software configuration, to implement one or more of the systems/subsystems described herein.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to configure the data processing system to implement a local segment analysis and security (LSAS) engine that operates to:
   collect, from one or more agents associated with computing resources in a first segment of a computing environment, status metrics indicating a current operational status of the computing resources within the first segment;
   analyze the status metrics to determine whether the first segment is the target of a first attack on one or more computing resources of the first segment;
   receive, from one or more other LSAS engines associated with one or more second segments of the computing environment, at least one message indicating a status of the one or more second segments with regard to the one or more second segments being a target of a second attack;
   determine a security response action to implement based on the received at least one message and results of the analysis; and
   transmit a control message to at least one computing resource of the first segment to implement the determined security response action to control a flow of data traffic to or from the first segment, wherein determining the security response action to implement comprises:
      performing a trend analysis on the status metrics for the first segment and applying results of the trend analysis to a plurality of rules associated with corresponding security response action indicators; and
      automatically selecting a security response action based on a rule in the plurality of rules whose criteria are met by the results of the trend analysis and other characteristics of at least one of the first attack or second attack.

2. The method of claim 1, wherein the determined security response action is a segmentation security response action that comprises throttling a bandwidth associated with at least one of an inter-segment communication channel or an intra-segment communication channel based on results of the analysis.

3. The method of claim 2, wherein an amount of throttling of the bandwidth is determined based on at least one of a type of at least one of the first attack or second attack, a source of at least one of the first attack or the second attack, or a determined severity of at least one of the first attack or second attack.

4. The method of claim 1, wherein the determined security response action is a segmentation security response action that comprises reducing an amount of bandwidth available to at least one intra-segment communication channel associated with the first segment in response to the results of the analysis indicating that the first segment is the target of the first attack.

5. The method of claim 1, wherein the determined security response action is a segmentation security response action that comprises reducing an amount of bandwidth available to at least one inter-segment communication channel associated with the first segment and a selected second segment in the one or more second segments, in response to the results of the analysis indicating that the selected second segment is the target of the second attack.

6. The method of claim 1, wherein the determined security response action is a dilution security response action that comprises injecting innocuous messages into at least one of an inter-segment communication channel or an intra-segment communication channel associated with at least one of the first attack or second attack identified by the results of the analysis.

7. The method of claim 1, wherein the determined security response action is a dilution security response action that comprises performing a sandboxing operation to redirect messages determined to be associated with the first attack to a virtual sandbox processing environment.

8. The method of claim 1, wherein the determined security response action is a dilution security response action that comprises performing a honeypot operation to redirect messages determined to be associated with the first attack to a virtual honeypot data structure comprising a pseudo-data data structure.

9. The method of claim 1, wherein the determined security response action comprises a scaffolding security response action that comprises sending one or more control messages, along an alternative communication channel, to at least one computing resource that is a target of the first attack to regain control of the at least one computing resource.

10. The method of claim 1, wherein the determined security response action comprises at least one of a segmentation security response action comprising throttling a bandwidth associated with a communication channel, a dilution security response action comprising injecting innocuous messages into a communication channel associated with at least one of the first attack or second attack, or a scaffolding security response action comprising sending a control message along an alternative communication channel to a target of the first attack to regain control of the target.

11. A computer program product comprising a non-transitory computer readable medium having a computer readable program stored therein, wherein the computer readable program, when executed on a computing device, causes the computing device to implement a local segment analysis and security (LSAS) engine that operates to:
 collect, from one or more agents associated with computing resources in a first segment of a computing environment, status metrics indicating a current operational status of the computing resources within the first segment;
 analyze the status metrics to determine whether the first segment is the target of a first attack on one or more computing resources of the first segment;
 receive, from one or more other LSAS engines associated with one or more second segments of the computing environment, at least one message indicating a status of the one or more second segments with regard to the one or more second segments being a target of a second attack;
 determine a security response action to implement based on the received at least one message and results of the analysis; and
 transmit a control message to at least one computing resource of the first segment to implement the determined security response action to control a flow of data traffic to or from the first segment, wherein determining the security response action to implement comprises:
  performing a trend analysis on the status metrics for the first segment and applying results of the trend analysis to a plurality of rules associated with corresponding security response action indicators; and
  automatically selecting a security response action based on a rule in the plurality of rules whose criteria are met by the results of the trend analysis and other characteristics of at least one of the first attack or second attack.

12. The computer program product of claim 11, wherein the determined security response action is a segmentation security response action that comprises throttling a bandwidth associated with at least one of an inter-segment communication channel or an intra-segment communication channel based on results of the analysis.

13. The computer program product of claim 12, wherein an amount of throttling of the bandwidth is determined based on at least one of a type of at least one of the first attack or second attack, a source of at least one of the first attack or the second attack, or a determined severity of at least one of the first attack or second attack.

14. The computer program product of claim 11, wherein the determined security response action is a segmentation security response action that comprises reducing an amount of bandwidth available to at least one intra-segment communication channel associated with the first segment in response to the results of the analysis indicating that the first segment is the target of the first attack.

15. The computer program product of claim 11, wherein the determined security response action is a segmentation security response action that comprises reducing an amount of bandwidth available to at least one inter-segment communication channel associated with the first segment and a selected second segment in the one or more second segments, in response to the results of the analysis indicating that the selected second segment is the target of the second attack.

16. The computer program product of claim 11, wherein the determined security response action is a dilution security response action that comprises injecting innocuous messages into at least one of an inter-segment communication channel or an intra-segment communication channel associated with at least one of the first attack or second attack identified by the results of the analysis.

17. The computer program product of claim 11, wherein the determined security response action is a dilution security response action that comprises performing a sandboxing operation to redirect messages determined to be associated with the first attack to a virtual sandbox processing environment.

18. The computer program product of claim 11, wherein the determined security response action is a dilution security response action that comprises performing a honeypot operation to redirect messages determined to be associated with the first attack to a virtual honeypot data structure comprising a pseudo-data data structure.

19. The computer program product of claim 11, wherein the determined security response action comprises a scaffolding security response action that comprises sending one or more control messages, along an alternative communication channel, to at least one computing resource that is a target of the first attack to regain control of the at least one computing resource.

20. An apparatus comprising:
 a processor; and
 a memory coupled to the processor, wherein the memory comprises instructions which, when executed by the processor, cause the processor to implement a local segment analysis and security (LSAS) engine that operates to:
 collect, from one or more agents associated with computing resources in a first segment of a computing environment, status metrics indicating a current operational status of the computing resources within the first segment;
 analyze the status metrics to determine whether the first segment is the target of a first attack on one or more computing resources of the first segment;
 receive, from one or more other LSAS engines associated with one or more second segments of the computing environment, at least one message indicating a status of the one or more second segments with regard to the one or more second segments being a target of a second attack;
 determine a security response action to implement based on the received at least one message and results of the analysis; and
 transmit a control message to at least one computing resource of the first segment to implement the determined security response action to control a flow of data traffic to or from the first segment, wherein determining the security response action to implement comprises:
  performing a trend analysis on the status metrics for the first segment and applying results of the trend analysis to a plurality of rules associated with corresponding security response action indicators, and
  automatically selecting a security response action based on a rule in the plurality of rules whose criteria are met by the results of the trend analysis and other characteristics of at least one of the first attack or second attack.

* * * * *